United States Patent
Desingu et al.

(10) Patent No.: US 12,431,815 B2
(45) Date of Patent: Sep. 30, 2025

(54) START-UP CONTROL FOR MULTILEVEL DUAL ACTIVE BRIDGE CONVERTER

(71) Applicant: Caterpillar Inc., Peoria, IL (US)

(72) Inventors: Karthik Desingu, Puducherry (IN); Jyothiraditya Ramaswamy, Anupuram (IN); Gregory J. Speckhart, Peoria, IL (US); James D. Siegle, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 216 days.

(21) Appl. No.: 18/242,757

(22) Filed: Sep. 6, 2023

(65) Prior Publication Data

US 2025/0080002 A1 Mar. 6, 2025

(51) Int. Cl.
*H02M 3/335* (2006.01)
*H02M 1/00* (2006.01)

(52) U.S. Cl.
CPC ..... *H02M 3/33584* (2013.01); *H02M 1/0043* (2021.05); *H02M 1/0058* (2021.05); *H02M 3/33573* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491
See application file for complete search history.

(56) References Cited

U.S. PATENT DOCUMENTS

| | | | |
|---|---|---|---|
| 9,595,873 B2 * | 3/2017 | Zane | H02M 3/33584 |
| 10,110,138 B1 | 10/2018 | Murthy-bellur et al. | |
| 2022/0263405 A1 | 8/2022 | Singh et al. | |
| 2022/0399819 A1 * | 12/2022 | Mohan | H02M 3/33569 |

(Continued)

FOREIGN PATENT DOCUMENTS

| | | |
|---|---|---|
| CN | 108880264 | 11/2018 |
| CN | 111884497 | 11/2020 |

(Continued)

OTHER PUBLICATIONS

A Transient Characteristics Improvement Method in Dual Active Bridge Converter with Multilevel Inverter Topology.

(Continued)

*Primary Examiner* — Jeffrey A Gblende

(57) ABSTRACT

Techniques are described to smooth start a multilevel dual active bridge converter by pre-charging the capacitors present on the converter without requiring any additional hardware. Various phase shift angles determine the power delivered by the dual active bridge converter. By using the techniques, a predefined amount of time is reserved to pre-charge the capacitors until the capacitors reach a desired voltage after which time the smooth starting of the dual active bridge converter is initiated.

20 Claims, 6 Drawing Sheets

(56) References Cited

U.S. PATENT DOCUMENTS

2022/0416684 A1   12/2022  Awal
2023/0353034 A1*  11/2023  Li ..................... H02M 3/33573

FOREIGN PATENT DOCUMENTS

| CN | 112234828 | 1/2021 |
| CN | 113364260 A | 9/2021 |
| CN | 113949258 A | 1/2022 |
| CN | 113179022 B | 8/2022 |

OTHER PUBLICATIONS

Capacitor Voltage Balancing Control for a Novel 5-Level Dual Active Bridge Converter.
Written Opinion and International Search Report for Int'l. Patent Appln. No. PCT/US2024/041603, mailed Nov. 22, 2024 (14 pgs).

* cited by examiner

START-UP CONTROL FOR MULTILEVEL DUAL ACTIVE BRIDGE CONVERTER

TECHNICAL FIELD

This disclosure relates generally to DC/DC converters and, more particularly, to start-up control techniques for dual active bridge converters.

BACKGROUND

A dual active bridge converter is a type of power electronics converter that facilitates the transformation of electrical power from one DC voltage level to a different DC voltage level. Dual active bridge converters are frequently used in a broad range of applications, such as energy storage systems, renewable energy systems, and electric vehicle chargers.

In a dual active bridge converter, there are two active bridges: one on the primary side (usually connected to a DC voltage source) and one on the secondary side (usually connected to a load). Each bridge includes a number of active switches, e.g., IGBTs or MOSFETs, depending on the design and application. These active switches are used to create a high frequency AC voltage from the DC source, which is then transformed and rectified to a DC voltage at a different level. The name "dual active bridge" comes from the fact that there are two active bridges, one on each side of a high frequency transformer. This setup allows bidirectional power flow.

CN112234828A relates to direct-current power distribution and utilization and aims to provide a multi-active-bridge power electronic transformer and a soft start method thereof. An auxiliary power supply and a soft start strategy are used for pre-charging an output side port capacitor, so the port voltage basically reaches a rated value, and then in the process of cutting off the auxiliary power supply and connecting a distributed power supply, the transformer smoothly enters a steady-state control mode through switching of control modes. The multi-mode control strategy has three degrees of freedom, and the three degrees of freedom respectively control the size and direction of transmission power from a high-voltage port to a medium-low-voltage port. According to the method, stable starting of port voltage can be ensured, the peak value of inductive current is successfully limited by pre-charging carried out from a high-voltage side, and system impact current is avoided.

SUMMARY

This disclosure describes techniques to smooth start the multilevel dual active bridge converter by pre-charging the capacitors present on the converter without requiring any additional hardware. Various phase shift angles determine the power delivered by the dual active bridge converter. By using the techniques of this disclosure, a predefined amount of time is reserved to pre-charge the capacitors until the capacitors reach a desired voltage after which time the smooth starting of the dual active bridge converter is initiated.

In some aspects, this disclosure is directed to a method for controlling start-up in a multilevel dual active bridge converter to pre-charge first and second capacitors, wherein the multilevel dual active bridge converter includes a first full bridge circuit having a first plurality of electronic switches, the first full bridge circuit configured to generate a first group of three voltage levels including a first DC voltage level, a one-half first DC voltage level, and a first zero voltage level, a second full bridge circuit including a second plurality of electronic switches, the second full bridge circuit configured to generate a second group of three voltage levels including a second DC voltage level, a one-half second DC voltage level, and a second zero voltage level, the first and second capacitors, a transformer coupled between the first full bridge circuit and the second full bridge circuit, and an inductor coupled between the first full bridge circuit and a primary winding of the transformer, the method comprising: during a start-up phase of the multilevel dual active bridge converter: setting an internal phase shift value corresponding to a duration of the one-half first DC voltage level to a first value; setting a phase shift angle value representing a phase shift between a first DC voltage level and a second DC voltage level to a second value; preventing operation of the second plurality of electronic switches; and while controlling operation of the first plurality of electronic switches: decreasing, over a period of time, an internal phase shift value corresponding to a duration of the first zero voltage level from a non-zero value to zero to pre-charge the first and second capacitors of the second full bridge circuit.

In some aspects, this disclosure is directed to a multilevel dual active bridge converter configured for controlling start-up to pre-charge first and second capacitors, the multilevel dual active bridge converter comprising: a first full bridge circuit having a first plurality of electronic switches, the first full bridge circuit configured to generate a first group of three voltage levels including a first DC voltage level, a one-half first DC voltage level, and a first zero voltage level; a second full bridge circuit including a second plurality of electronic switches, the second full bridge circuit configured to generate a second group of three voltage levels including a second DC voltage level, a one-half second DC voltage level, and a second zero voltage level; a transformer coupled between the first full bridge circuit and the second full bridge circuit; an inductor coupled between the first full bridge circuit and a primary winding of the transformer; and a control circuit configured for: during a start-up phase of the multilevel dual active bridge converter: setting an internal phase shift value corresponding to a duration of the one-half first DC voltage level to zero; setting a phase shift angle value representing a phase shift between a first DC voltage level and a second DC voltage level to zero; preventing operation of the second plurality of electronic switches; and while controlling operation of the first plurality of electronic switches: decreasing, over a period of time, an internal phase shift value corresponding to the duration of the first zero voltage level from a non-zero value to zero to pre-charge the first and second capacitors of the second full bridge circuit.

In some aspects, this disclosure is directed to a control circuit configured for controlling start-up to pre-charge first and second capacitors in a multilevel dual active bridge converter, wherein the multilevel dual active bridge converter includes a first full bridge circuit having a first plurality of electronic switches, the first full bridge circuit configured to generate a first group of three voltage levels including a first DC voltage level, a one-half first DC voltage level, and a first zero voltage level, a second full bridge circuit including a second plurality of electronic switches, the second full bridge circuit configured to generate a second group of three voltage levels including a second DC voltage level, a one-half second DC voltage level, and a second zero voltage level, a transformer coupled between the first full bridge circuit and the second full bridge circuit, and an inductor coupled between the first full bridge circuit and a primary winding of the transformer, the control circuit configured to perform operations comprising: setting an internal phase shift value corresponding to a duration of the one-half first DC voltage level to zero; setting a phase shift angle value representing a phase shift between a first DC voltage level and a second DC voltage level to zero; preventing operation of the second plurality of electronic switches; and while controlling operation of the first plurality of electronic switches: decreasing, over a period of time, an internal phase shift value corresponding to a duration of the first zero voltage level from a non-zero value to zero to pre-charge the first and second capacitors of the second full bridge circuit.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

DC-DC converters, such as n-level n-level (nL-nL) dual active bridge converters, are used for battery energy storage systems (BESS) and mining trucks, particularly for large mining trucks (LMTs). However, the components (such as the battery, IGBTs, transformer, inductor, and capacitors) utilized in these converters are current sensitive. When these components are pushed to their maximum threshold current limits, the integrity, performance, and overall service life of the components can be negatively impacted.

One instance that presents a significant challenge to the operation of the multilevel dual active bridge converter is during start-up in which high current demand is experienced. The high current causes voltage spikes on the components, which can result in damage to the components that can eventually lead to failure of the dual active bridge converter. Therefore, the present inventors have recognized a need for a solution to address the issue of high inrush current during start-up of the multilevel dual active bridge converter.

This disclosure describes techniques to smooth start the multilevel dual active bridge converter by pre-charging the capacitors present on the converter without requiring any additional hardware. Various phase shift angles determine the power delivered by the dual active bridge converter. By using the techniques of this disclosure, a predefined amount of time is reserved to pre-charge the capacitors until the capacitors reach a desired voltage after which time the smooth starting of the dual active bridge converter is initiated.

Figure 1:
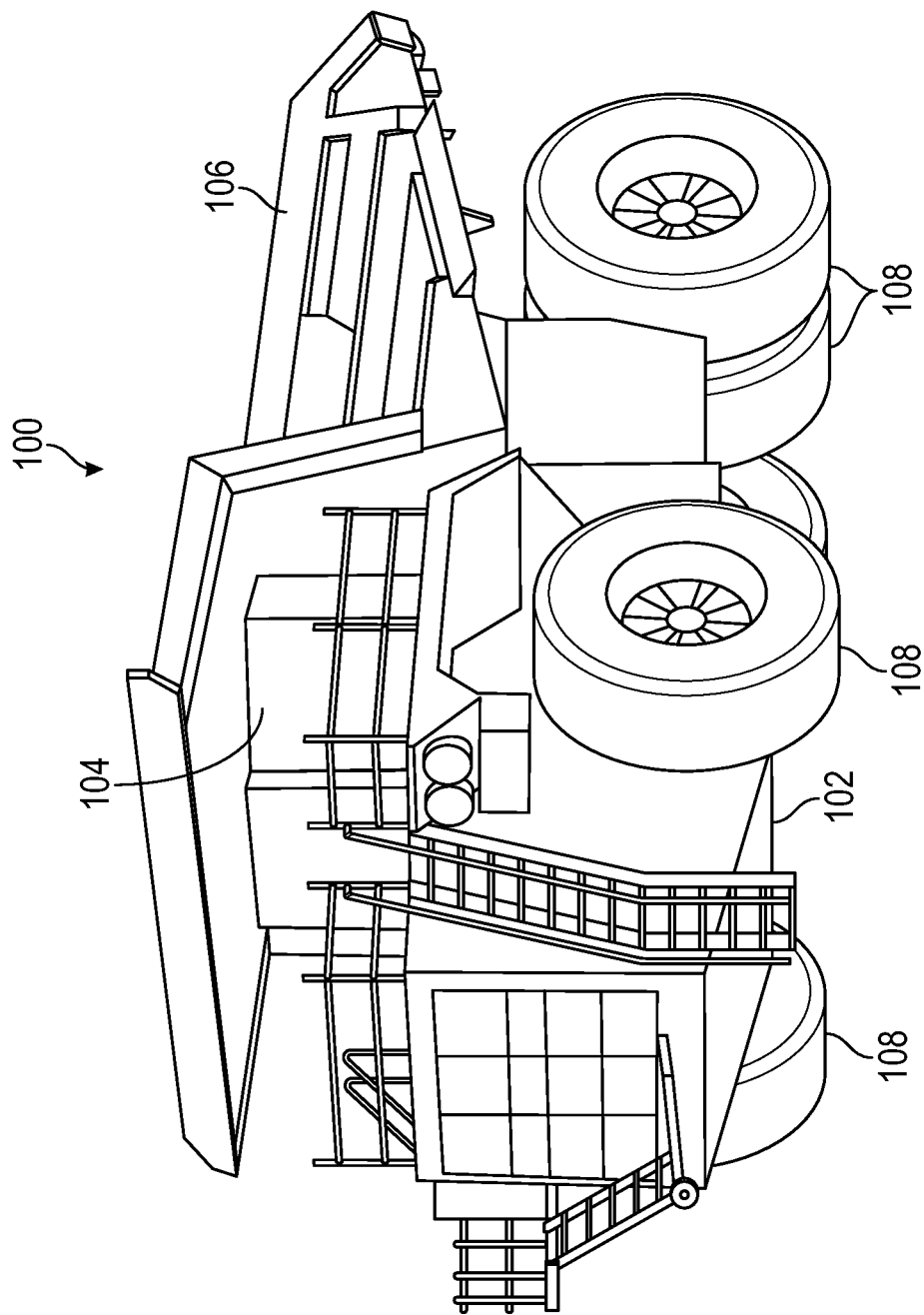
FIG. 1 is a perspective view of an example of an electric machine that can implement various dual active bridge converter techniques of this disclosure.

FIG. 1 is a perspective view of an example of an electric machine that can implement various dual active bridge DC converter techniques of this disclosure. A non-limiting example of an electric machine 100 is shown in FIG. 1. The electric machine 100 can be any stationary, or mobile, machine powered, at least partially, by batteries, as will be described below with reference to FIG. 2. The electric machine 100 can be a mining truck, as depicted, or may alternatively embody an on-highway or off-highway machine or any other vehicle that is configured to be propelled. In some examples, the electric machine 100 includes a frame 102 supporting at least an operator control station 104 and a dump body 106. Ground-engaging elements 108, such as wheels and/or tires (or tracks), may also be supported by the frame 102, and can be powered by a drive system supported by the frame 102.

Figure 2:
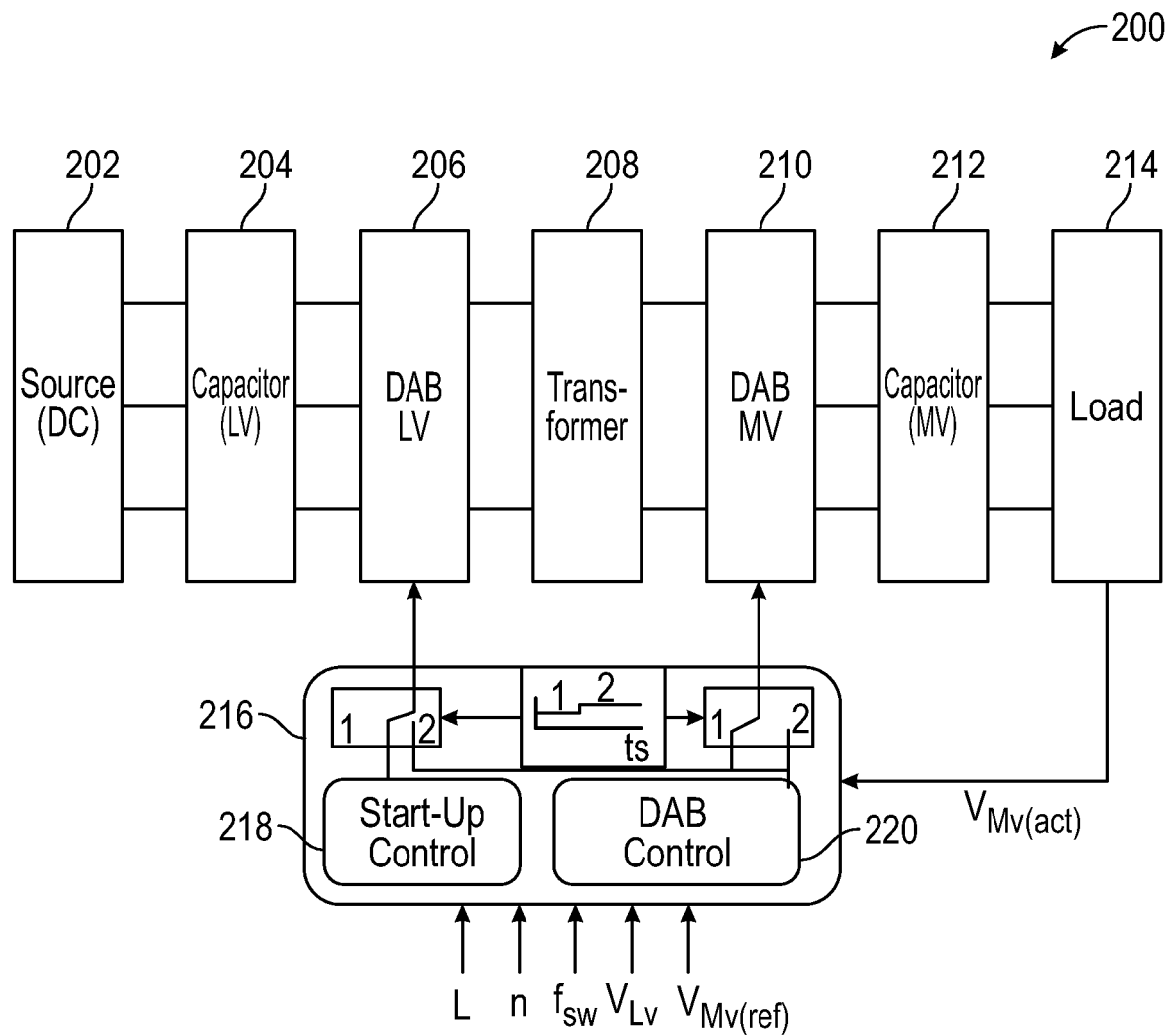
FIG. 2 is a diagrammatic view of an example of an electric powertrain using the dual active bridge converter of this disclosure.

FIG. 2 is a diagrammatic view of an example of an electric powertrain using the multilevel dual active bridge converter of this disclosure. The powertrain 200 can be used in combination with an electric machine, such as the electric machine 100 of FIG. 1. In the example shown, the powertrain 200 includes a DC power source 202, such as one or more battery modules that each include one or more battery cells. The DC power source 202 is electrically coupled with capacitors 204. The capacitors 204 are electrically coupled with a first full bridge circuit 206. A transformer 208 is electrically coupled between the first full bridge circuit 206 and a second full bridge circuit 210. The second full bridge circuit 210 is electrically coupled with capacitors 212, and an electrically drivable load 214, such as a motor of an electric machine, is electrically coupled with the capacitors 212. The multilevel dual active bridge converter includes the first full bridge circuit 206, the transformer 208, and the second full bridge circuit 210. The multilevel dual active bridge converter is controlled by a control circuit 216.

The control circuit 216 is electrically coupled with the first full bridge circuit 206 and the second full bridge circuit 210 and is configured to control operation of a plurality of electronic switches, e.g., insulated-gate bipolar transistors (IGBT), of each of the first full bridge circuit 206 and the second full bridge circuit 210. The control circuit 216 can include start-up control circuit 218 and a dual active bridge converter control circuit 220. The control circuit 216 is configured to receive various inputs including an inductance (L) of an inductor coupled with the transformer 208, a number of turns (n) of the transformer 208, a switching frequency ($f_{sw}$) at which the switches should be operated, a voltage ($V_{LV}$) of the first full bridge circuit 206, a reference voltage ($V_{MV(ref)}$) of the second full bridge circuit 210, and an actual voltage ($V_{MV(act)}$) of the second full bridge circuit 210, as fed back from the electrically drivable load 214. By using various techniques described below, the control circuit 216 can smooth start the dual active bridge converter by pre-charging the capacitors 212 without requiring any additional hardware.

Figure 3:
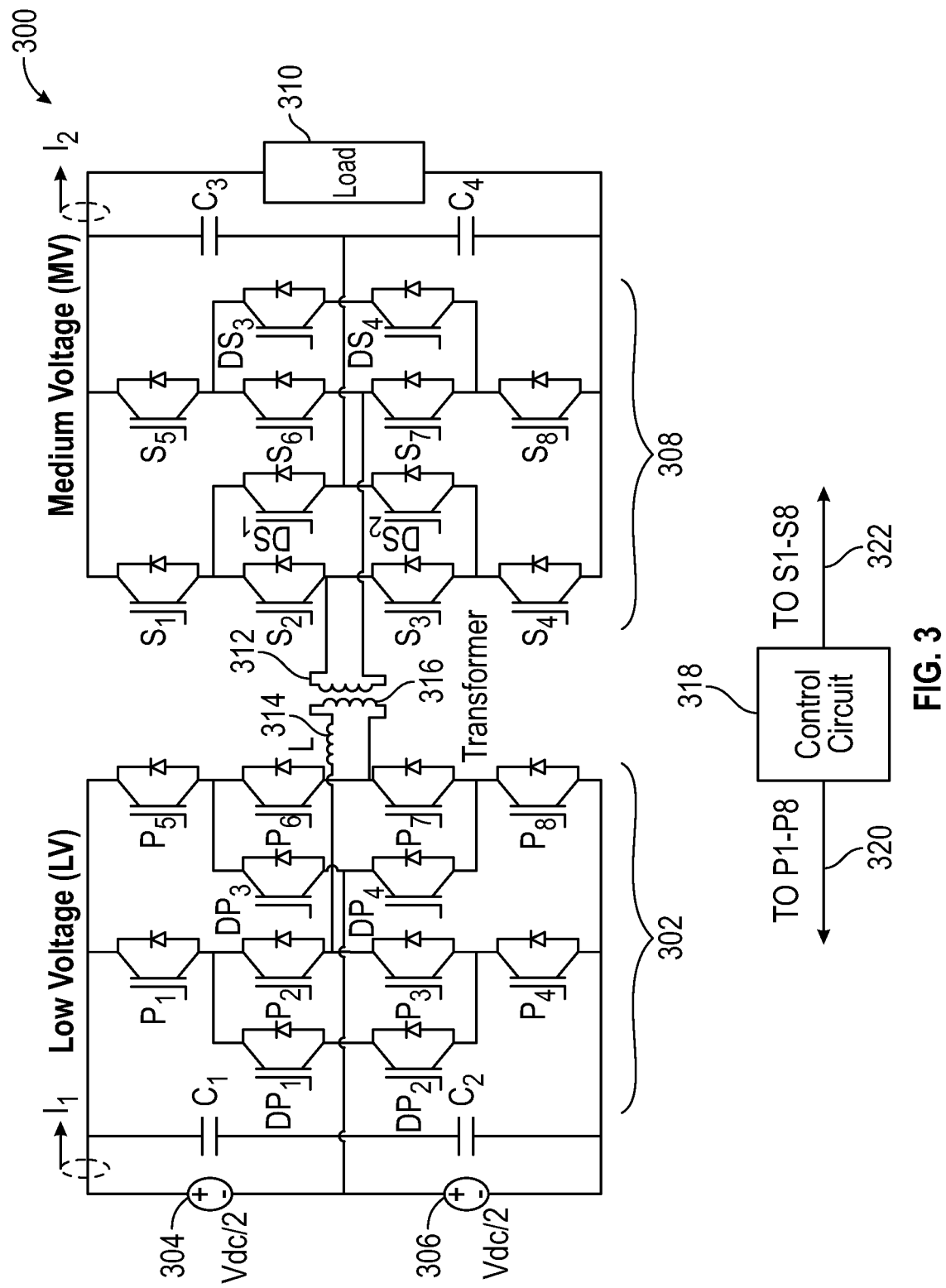
FIG. 3 is a schematic illustration of a multilevel dual active bridge converter 300 that can be used by the machine of FIG. 1.

FIG. 3 is a schematic illustration of a multilevel dual active bridge converter 300 that can be used by the machine of FIG. 1. The multilevel dual active bridge converter 300 of FIG. 3 can be a 3-Level 3-Level converter or higher (n-Level n-Level). The dual active bridge converter 300 includes a first full bridge circuit 302, such as the first full bridge circuit 206 of FIG. 2. The first full bridge circuit 302 is configured to generate a first group of three voltage levels including a first DC voltage level, a one-half first DC voltage level, and a first zero voltage level.

The first full bridge circuit 302 is electrically coupled with a first capacitor C1 and a second capacitor C2, such as the capacitors 204 of FIG. 2. The first capacitor C1 is electrically coupled with a first DC source 304 (Vdc/2) and the second capacitor C2 is electrically coupled with a second DC source 306 (Vdc/2), such as the DC power source 202 of FIG. 2.

The multilevel dual active bridge converter 300 includes a second full bridge circuit 308, such as the second full bridge circuit 210 of FIG. 2. The second full bridge circuit 308 is configured to generate a second group of three voltage levels including a second DC voltage level, a one-half second DC voltage level, and a second zero voltage level. In some examples, the first DC voltage level of the first full bridge circuit 302 is less than the second DC voltage level of the second full bridge circuit 308.

The second full bridge circuit 308 is electrically coupled with a third capacitor C3 and a fourth capacitor C4, such as the capacitors 212 of FIG. 2. The third capacitor C3 and the fourth capacitor C4 are electrically coupled with a load 310, such as the electrically drivable load 214 of FIG. 2.

A transformer 312 having a turns ratio n is electrically coupled between the first full bridge circuit 302 and the second full bridge circuit 308. An inductor 314 having an inductance L is electrically coupled between the first full bridge circuit 302 and a primary winding 316 of the transformer 312.

In this disclosure, the first full bridge circuit 302 is referred to as the low voltage (LV) side (e.g., primary side) and the second full bridge circuit 308 is referred to as the medium voltage (MV) side (e.g., secondary side), meaning that the first full bridge circuit 302 outputs a voltage that is lower than the voltage output by the second full bridge circuit 308. It should be noted that the dual active bridge converter 300 is a bidirectional device such that either full bridge circuit can generate and supply power to the other full bridge circuit.

The first full bridge circuit 302 includes a first plurality of electronic switches, namely switches P1-P8, e.g., IGBTs, and includes a plurality of clamping diodes, namely diodes DP1-DP 4. Similarly, the second full bridge circuit 308 includes a second plurality of electronic switches, namely switches S1-S8, and includes a plurality of clamping diodes, namely diodes DS1-DS4.

A control circuit 318, such as the control circuit 216 of FIG. 2, can output various control signals 320 to control the switching operation of the electronic switches P1-P8. Similarly, the control circuit 318 can output various control signals 322 to control the switching operation of electronic switches S1-S8. The control circuit 318 can use those control signals to perform various operations to pre-charge the capacitors C3 and C4 coupled to the load 310, which can control a smooth start-up of the dual active bridge converter 300. Various inputs can be applied to the start-up control circuit 218 of the control circuit 318 to generate those control signals, including:

1. $\delta$, which is the phase shift angle value that corresponds to a time difference between a midpoint of a duration of the first DC voltage level and a midpoint of a duration of the second DC voltage level and determines a power transfer;

2. $\alpha\_1$, which is an internal phase shift value of the LV side corresponding to a duration of a first zero voltage level (0 voltage state);

3. $\alpha\_2$, which is an internal phase shift value of the LV side corresponding to a duration of one-half the first DC voltage level (+/−Vdc/2 state);

4. $\beta\_1$, which is an internal phase shift value of the MV side corresponding to a duration of a second zero voltage level (0 voltage state); and 5. $\beta\_2$, which is an internal phase shift value of the MV side corresponding to a duration of one-half the second DC voltage level (+/−Vdc/2 state).

At start-up, the capacitors C1 and C2 get charged from the low voltage side but the medium voltage side does not have dedicated hardware to charge the capacitors C3 and C4. Instead of including dedicated hardware, the control circuit 318 can control the dual active bridge converter 300 in such a way that the capacitors C3 and C4 can be pre-charged.

Figure 4:
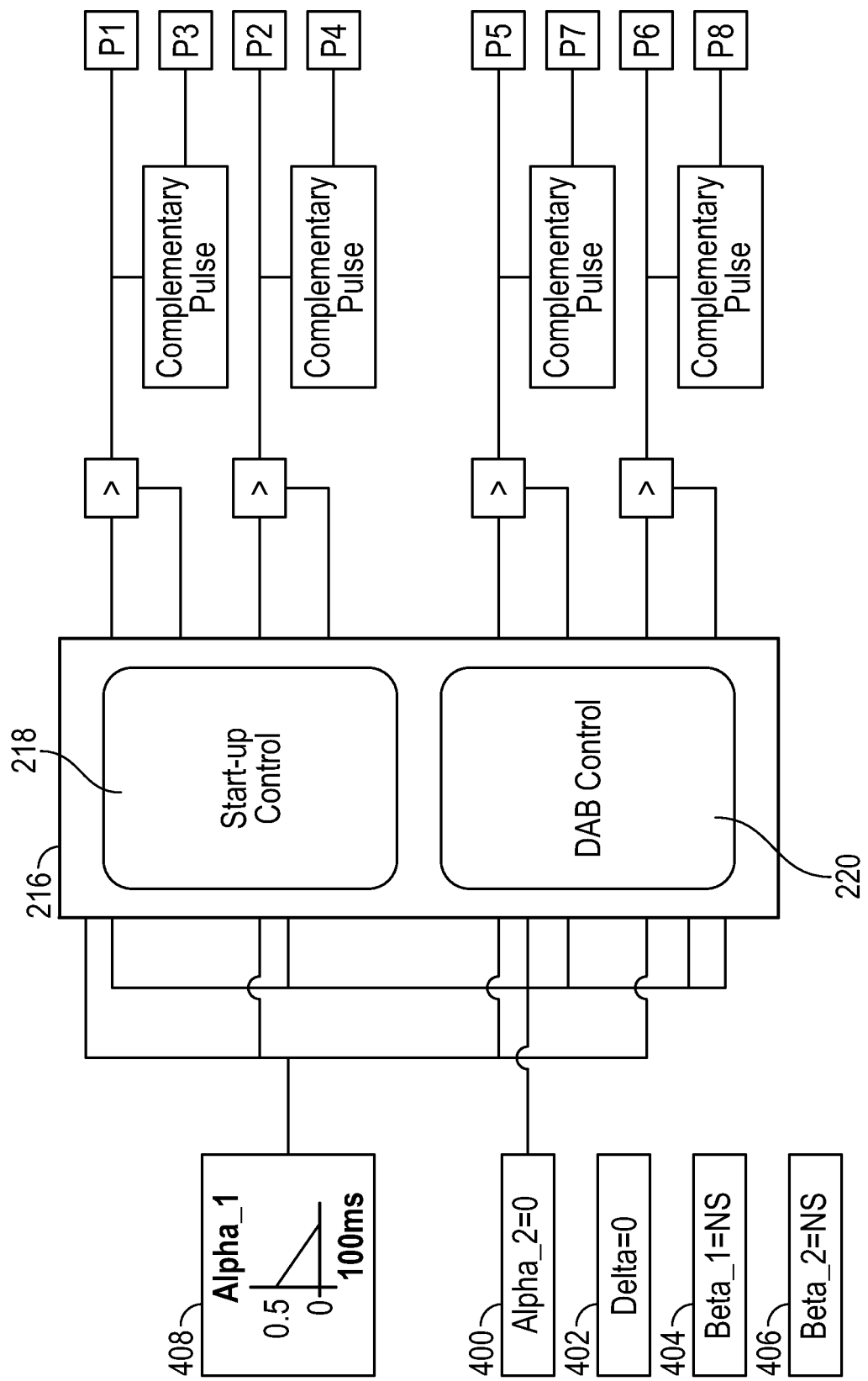
FIG. 4 is a diagrammatic view depicting the control circuit of FIG. 2 receiving various inputs during a start-up phase to control operation of the multilevel dual active bridge converter of this disclosure.

FIG. 4 is a diagrammatic view depicting the control circuit of FIG. 2 receiving various inputs during a start-up phase to control operation of the multilevel dual active bridge converter. The control circuit 216 is configured to generate control signals to control operation of the first plurality of electronic switches P1-P8. As seen in FIG. 4, pairs of electronic switches are controlled by complementary control signals: switches P1 and P3 are controlled by complementary control signals, switches P2 and P4 are controlled by complementary control signals, switches P5 and P7 are controlled by complementary control signals, and switches P6 and P8 are controlled by complementary control signals.

In accordance with this disclosure, during a start-up phase of the multilevel dual active bridge converter, such as the dual active bridge converter 300 of FIG. 3, the start-up control circuit 218 of the control circuit 216 sets an internal phase shift value corresponding to a duration of the one-half first DC voltage level to a first value. That is, $\alpha\_2$, which is an internal phase shift value of the LV side corresponding to a duration of one-half the first DC voltage level (or Vdc/2) is set to a first value, such as a value representing between 0 and 15 degrees inclusive. For example, in FIG. 4, the value of $\alpha\_2$ is set to 0, as shown at 400.

During the start-up phase, the start-up control circuit 218 of the control circuit 216 sets a phase shift angle value representing a phase shift between a first DC voltage level and a second DC voltage level to a second value. That is, $\delta$, which is a phase shift angle value that corresponds to a time difference between a midpoint of a duration of the first DC voltage level and a midpoint of a duration of the second DC voltage level and determines a power transfer, is set to a second value, such as a value representing between 0 and 15 degrees inclusive. For example, in FIG. 4, the value of 6 is set to 0, as shown at 402.

During the start-up phase, the start-up control circuit 218 of the control circuit 216 is configured to prevent the switching operation of the second plurality of electronic switches of second full bridge circuit 308 of FIG. 3. For example, the start-up control circuit 218 of the control circuit 216 can set $\beta\_1$, which is an internal phase shift value of the MV side corresponding to a duration of a second zero voltage level (0 voltage state), to no switching (NS), as shown at 404. In addition, the control circuit 216 can set $\beta\_2$, which is an internal phase shift value of the MV side corresponding to a duration of one-half the second DC voltage level (+/−Vdc/2 state), to no switching (NS), as shown at 406.

Then, during the start-up phase and while controlling operation of the first plurality of electronic switches, the start-up control circuit 218 of the control circuit 216 can decrease, over a period of time, an internal phase shift value corresponding to a duration of the first zero voltage level from a non-zero value to zero to pre-charge the first and second capacitors of the second full bridge circuit. That is, $\alpha\_1$, which is an internal phase shift value of the LV side corresponding to a duration of a first zero voltage level (0 voltage state) is decreased, over a period of time, from a non-zero value to zero, as shown at 408. For example, the start-up control circuit 218 of the control circuit 216 can decrease $\alpha\_1$ from a value representing 180 degrees to a value representing 0 degrees. In some examples, the period of time can be 100 milliseconds. In other examples, the period of time can be less than or greater than 100 milliseconds. In this manner, the control circuit 216 can pre-charge the first and second capacitors coupled to the second full bridge circuit, namely the capacitors C3 and C4 of FIG. 3.

In some examples, the start-up control circuit 218 of the control circuit 216 can decrease $\alpha\_1$ from a non-zero value to zero linearly. In other examples, the start-up control circuit 218 of the control circuit 216 can decrease $\alpha\_1$ from a non-zero value to zero non-linearly.

By using these techniques, the multilevel dual active bridge converter controls the zero voltage $\alpha\_1$ state to extend over a longer duration than other approaches. Then, the start-up control circuit 218 gradually reduces the duration of the zero voltage $\alpha\_1$ state as the capacitors of the medium voltage side are pre-charged, namely capacitors C3 and C4 of FIG. 3. Meanwhile, the start-up control circuit 218 keeps $\alpha\_2=0$ and $\delta=0$ and does not switch any of switches of the medium voltage side. That is, the start-up control circuit 218 only switches the low voltage side and not the medium voltage side.

After the period of time, e.g., 100 milliseconds, the start-up control circuit 218 can terminate the start-up phase of the dual active bridge converter 300 and enter a normal operating mode. In the normal operating mode, the dual active bridge converter control circuit 220 of the control circuit 216 can begin controlling operation (switching) the second plurality of electronic switches S1-S8 of the second full bridge circuit while controlling operation (switching) of the first plurality of electronic switches P1-P8 of the first full bridge circuit. In contrast, and as mentioned above, during the start-up phase, the start-up control circuit 218 of the control circuit 216 is configured to prevent operation of the second plurality of electronic switches of the second full bridge circuit.

Figure 5:
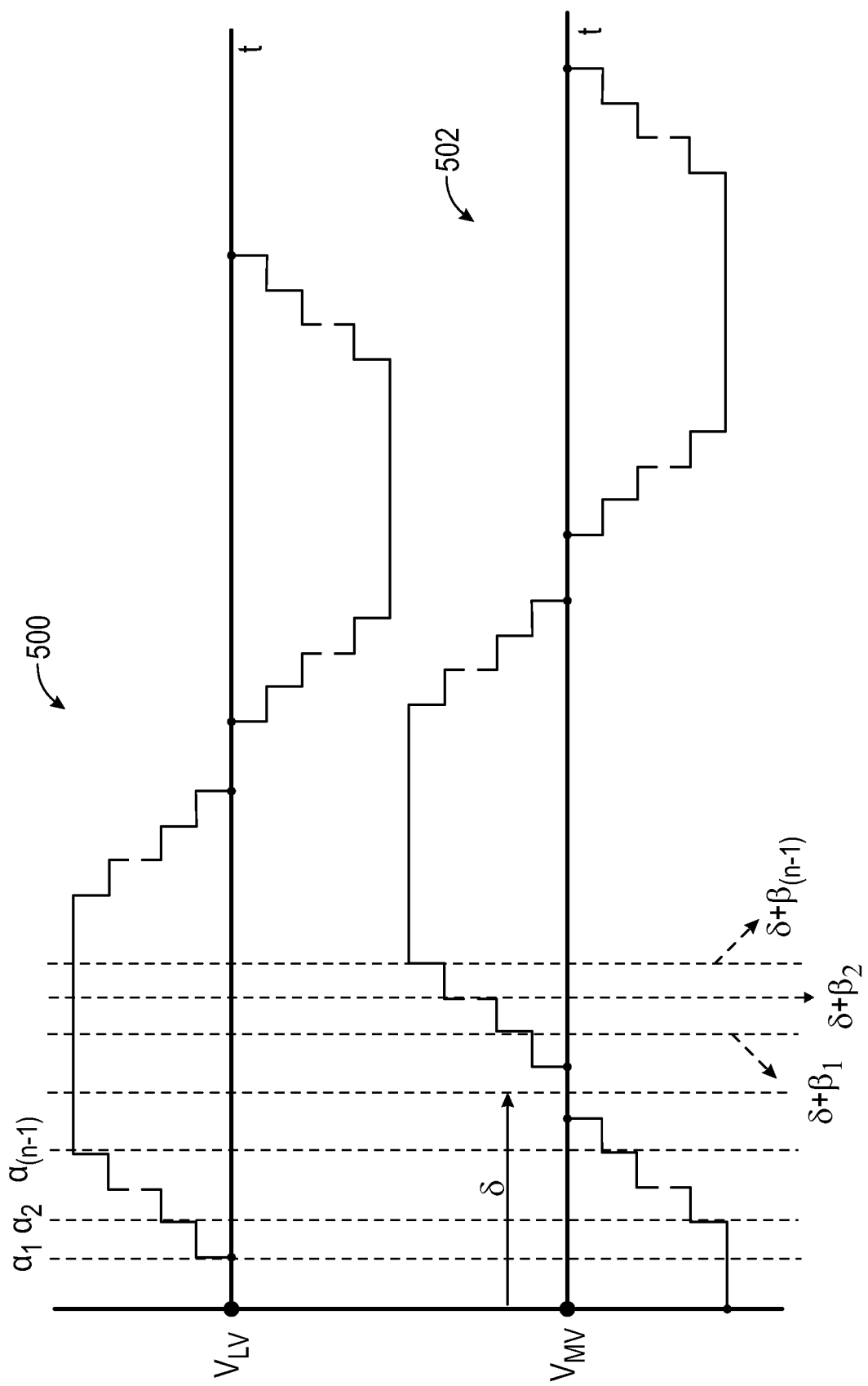
FIG. 5 graphically depicts the output voltage waveforms of the first full bridge circuit and the second full bridge circuit of the multilevel dual active bridge converter and illustrates the associated phase shifts.

FIG. 5 graphically depicts the output voltage waveforms of the first full bridge circuit and the second full bridge circuit of the multilevel dual active bridge converter and illustrates the associated phase shifts. The first full bridge circuit, such as the first full bridge circuit 302 of FIG. 3, outputs a voltage waveform 500 ($V_{LV}$) having an $\alpha\_1$ state, which is the duration of the zero voltage state. The $\alpha\_2$ state is the duration of the next voltage level, and so forth to an $\alpha\_(n-1)$ state. These durations are a function of a switching frequency controlled by the control circuit.

The second full bridge circuit, such as the second full bridge circuit 308 of FIG. 3, outputs a voltage waveform 502 having a $\beta\_1$ state, which is the duration of the zero voltage state. The $\beta\_2$ state is the duration of the next voltage level, and so forth to a $\beta\_(n-1)$ state. These durations are a function of a switching frequency controlled by the control circuit. The phase shift angle value $\delta$ represents a phase shift between a first DC voltage level and a second DC voltage level.

Figure 6:
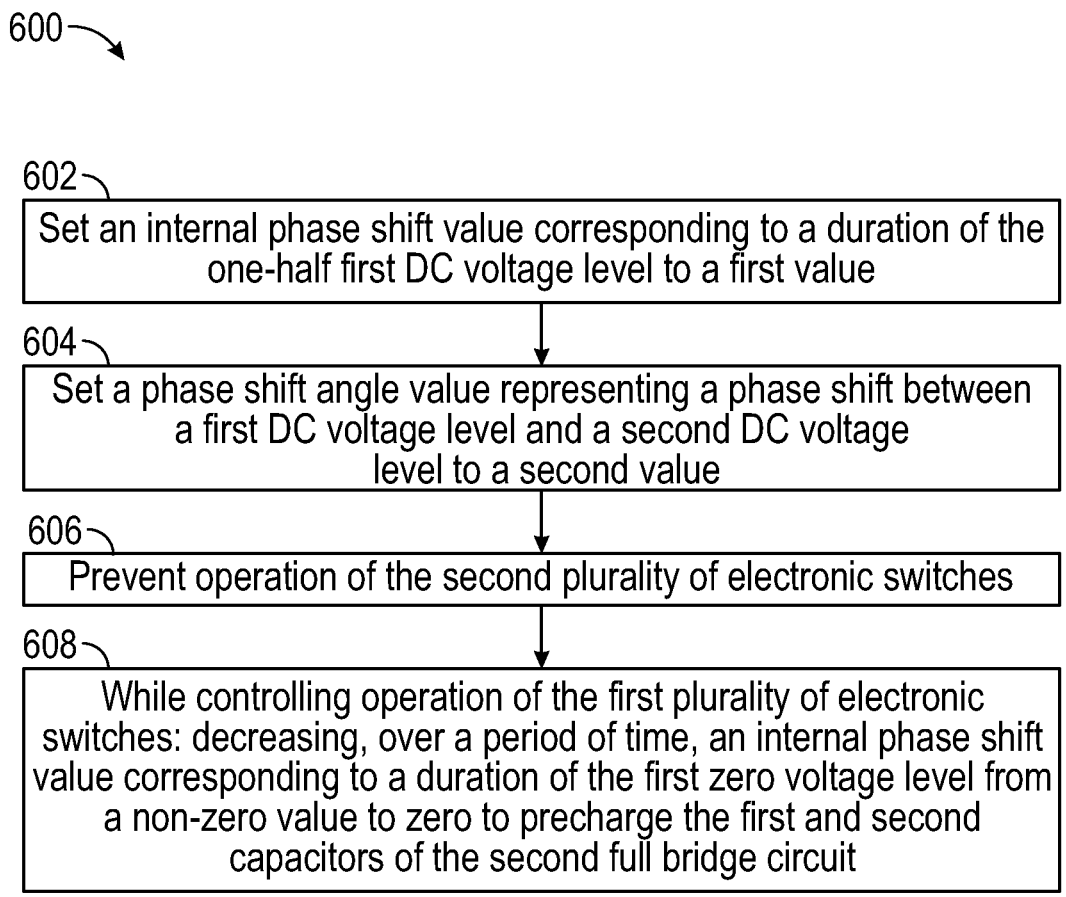
FIG. 6 is a flow diagram of a method for controlling start-up in a multilevel dual active bridge converter to pre-charge first and second capacitors of a full bridge circuit.

FIG. 6 is a flow diagram of a method for controlling start-up in a multilevel dual active bridge converter to pre-charge first and second capacitors, where the dual active bridge converter includes a first full bridge circuit having a first plurality of electronic switches, the first full bridge circuit configured to generate a first group of three voltage levels including a first DC voltage level, a one-half first DC voltage level, and a first zero voltage level, a second full bridge circuit including a second plurality of electronic switches, the second full bridge circuit configured to generate a second group of three voltage levels including a second DC voltage level, a one-half second DC voltage level, and a second zero voltage level, the first and second capacitors, a transformer coupled between the first full bridge circuit and the second full bridge circuit, and an inductor coupled between the first full bridge circuit and a primary winding of the transformer.

The operations in FIG. 6 occur during a start-up phase of the multilevel dual active bridge converter. At block 602, the method 600 includes setting an internal phase shift value corresponding to a duration of the one-half first DC voltage level to a first value, such as to a value representing between 0 and 15 degrees inclusive.

At block 604, the method 600 includes setting a phase shift angle value representing a phase shift between a first DC voltage level and a second DC voltage level to a second value, such as to a value representing between 0 and 15 degrees inclusive.

At block 606, the method 600 includes preventing operation of the second plurality of electronic switches.

At block 608, while controlling operation of the first plurality of electronic switches, the method 600 includes decreasing, over a period of time, an internal phase shift value corresponding to a duration of the first zero voltage level from a non-zero value to zero to pre-charge the first and second capacitors of the second full bridge circuit. In some examples, the method 600 includes decreasing, over the period of time, the internal phase shift value corresponding to the duration of the first zero voltage level from a value representing 180 degrees to a value representing 0 degrees. In some examples, the period of time is 100 milliseconds.

In some examples, the method 600 includes generating, via the first full bridge circuit, the first DC voltage level, and generating, via the second full bridge circuit, the second DC voltage level, wherein the first DC voltage level is less than the second DC voltage level.

In some examples, the method 600 includes terminating the start-up phase after the period of time. In some examples, the method 600 includes controlling, after terminating the start-up phase, operation of the second plurality of electronic switches while controlling operation of the first plurality of electronic switches.

INDUSTRIAL APPLICABILITY

The technique for smooth starting a dual active bridge converter by pre-charging the capacitors described above has significant industrial applicability in power electronics and renewable energy systems. The dual active bridge converter is widely used in various applications, such as battery energy storage systems, electric vehicle charging, renewable energy integration, and DC microgrids. When a dual active bridge converter is initially powered on, the capacitors connected to its input and output sides are discharged. Without pre-charging, the sudden rush of current to charge these capacitors can cause excessive stress on the converter's components, potentially leading to device failure or damage. The pre-charging technique mitigates this by gradually charging the capacitors, reducing inrush current and protecting the converter from stress-related issues.

By ensuring a smooth start-up, the pre-charging technique enhances the reliability and operational lifespan of the dual active bridge converter. Minimizing stress during startup reduces the wear and tear on the converter's components, leading to a more robust and durable system.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A method for controlling start-up in a multilevel dual active bridge converter to pre-charge first and second capacitors, wherein the multilevel dual active bridge converter includes a first full bridge circuit having a first plurality of electronic switches, the first full bridge circuit configured to generate a first group of three voltage levels including a first DC voltage level, a one-half first DC voltage level, and a first zero voltage level, a second full bridge circuit including a second plurality of electronic switches, the second full bridge circuit configured to generate a second group of three voltage levels including a second DC voltage level, a one-half second DC voltage level, and a second zero voltage level, the first and second capacitors, a transformer coupled between the first full bridge circuit and the second full bridge circuit, and an inductor coupled between the first full bridge circuit and a primary winding of the transformer, the method comprising:

during a start-up phase of the multilevel dual active bridge converter:
setting an internal phase shift value corresponding to a duration of the one-half first DC voltage level to a first value;
setting a phase shift angle value representing a phase shift between a first DC voltage level and a second DC voltage level to a second value;
preventing operation of the second plurality of electronic switches; and
while controlling operation of the first plurality of electronic switches:
decreasing, over a period of time, an internal phase shift value corresponding to a duration of the first zero voltage level from a non-zero value to zero to pre-charge the first and second capacitors of the second full bridge circuit.

2. The method of claim 1, wherein decreasing, over the period of time, the internal phase shift value corresponding to the duration of the first zero voltage level from the non-zero value to zero includes:
decreasing, over the period of time, the internal phase shift value corresponding to the duration of the first zero voltage level from a value representing 180 degrees to a value representing 0 degrees.

3. The method of claim 1, wherein setting the internal phase shift value corresponding to the duration of the one-half first DC voltage level to the first value includes:
setting the internal phase shift value corresponding to the duration of the one-half first DC voltage level to a value representing between 0 and 15 degrees inclusive; and
wherein setting the phase shift angle value representing the phase shift between the first DC voltage level and a second DC voltage level to the second value includes:
setting the phase shift angle value representing the phase shift between the first DC voltage level and a second DC voltage level to a value representing between 0 and 15 degrees inclusive.

4. The method of claim 1, wherein decreasing, over the period of time, the internal phase shift value corresponding to the duration of the first zero voltage level from the non-zero value to zero includes:
decreasing, over 100 milliseconds, the internal phase shift value corresponding to the duration of the first zero voltage level from the non-zero value to zero.

5. The method of claim 1, wherein decreasing, over the period of time, the internal phase shift value corresponding to the duration of the first zero voltage level from the non-zero value to zero includes:
linearly decreasing, over the period of time, the internal phase shift value corresponding to the duration of the first zero voltage level from the non-zero value to zero.

6. The method of claim 1, comprising:
generating, via the first full bridge circuit, the first DC voltage level; and
generating, via the second full bridge circuit, the second DC voltage level, wherein the first DC voltage level is less than the second DC voltage level.

7. The method of claim 1, further comprising:
terminating the start-up phase after the period of time.

8. The method of claim 7, further comprising:
controlling, after terminating the start-up phase, operation of the second plurality of electronic switches while controlling operation of the first plurality of electronic switches.

9. A multilevel dual active bridge converter configured for controlling start-up to pre-charge first and second capacitors, the multilevel dual active bridge converter comprising:
a first full bridge circuit having a first plurality of electronic switches, the first full bridge circuit configured to generate a first group of three voltage levels including a first DC voltage level, a one-half first DC voltage level, and a first zero voltage level;
a second full bridge circuit including a second plurality of electronic switches, the second full bridge circuit configured to generate a second group of three voltage levels including a second DC voltage level, a one-half second DC voltage level, and a second zero voltage level;

a transformer coupled between the first full bridge circuit and the second full bridge circuit;

an inductor coupled between the first full bridge circuit and a primary winding of the transformer; and a control circuit configured for:
during a start-up phase of the multilevel dual active bridge converter:
setting an internal phase shift value corresponding to a duration of the one-half first DC voltage level to zero;
setting a phase shift angle value representing a phase shift between a first DC voltage level and a second DC voltage level to zero;
preventing operation of the second plurality of electronic switches; and
while controlling operation of the first plurality of electronic switches:
decreasing, over a period of time, an internal phase shift value corresponding to the duration of the first zero voltage level from a non-zero value to zero to pre-charge the first and second capacitors of the second full bridge circuit.

10. The multilevel dual active bridge converter of claim 9, wherein the control circuit configured for decreasing, over the period of time, the internal phase shift value corresponding to the duration of the first zero voltage level from the non-zero value to zero is configured for:
decreasing, over the period of time, the internal phase shift value corresponding to the duration of the first zero voltage level from a value representing 180 degrees to a value representing 0 degrees.

11. The multilevel dual active bridge converter of claim 9, wherein the control circuit configured for setting the internal phase shift value corresponding to the duration of the one-half first DC voltage level to the first value is configured for:
setting the internal phase shift value corresponding to the duration of the one-half first DC voltage level to a value representing between 0 and 15 degrees inclusive; and
wherein the control circuit configured for setting the phase shift angle value representing the phase shift between the first DC voltage level and a second DC voltage level to the second value is configured for:
setting the phase shift angle value representing the phase shift between the first DC voltage level and a second DC voltage level to a value representing between 0 and 15 degrees inclusive.

12. The multilevel dual active bridge converter of claim 9, wherein the control circuit configured for decreasing, over the period of time, the internal phase shift value corresponding to the duration of the first zero voltage level from the non-zero value to zero is configured for:
decreasing, over 100 milliseconds, the internal phase shift value corresponding to the duration of the first zero voltage level from the non-zero value to zero.

13. The multilevel dual active bridge converter of claim 9, wherein the control circuit configured for decreasing, over the period of time, the internal phase shift value corresponding to the duration of the first zero voltage level from the non-zero value to zero is configured for:
linearly decreasing, over the period of time, the internal phase shift value corresponding to the duration of the first zero voltage level from the non-zero value to zero.

14. The multilevel dual active bridge converter of claim 9, wherein the first full bridge circuit is configured to generate the first DC voltage level, wherein the second full bridge circuit is configured to generate the second DC voltage level, and wherein the first DC voltage level is less than the second DC voltage level.

15. A control circuit configured for controlling start-up to pre-charge first and second capacitors in a multilevel dual active bridge converter, wherein the multilevel dual active bridge converter includes a first full bridge circuit having a first plurality of electronic switches, the first full bridge circuit configured to generate a first group of three voltage levels including a first DC voltage level, a one-half first DC voltage level, and a first zero voltage level, a second full bridge circuit including a second plurality of electronic switches, the second full bridge circuit configured to generate a second group of three voltage levels including a second DC voltage level, a one-half second DC voltage level, and a second zero voltage level, a transformer coupled between the first full bridge circuit and the second full bridge circuit, and an inductor coupled between the first full bridge circuit and a primary winding of the transformer, the control circuit configured to perform operations comprising:
setting an internal phase shift value corresponding to a duration of the one-half first DC voltage level to zero;
setting a phase shift angle value representing a phase shift between a first DC voltage level and a second DC voltage level to zero;
preventing operation of the second plurality of electronic switches; and
while controlling operation of the first plurality of electronic switches: decreasing, over a period of time, an internal phase shift value corresponding to a duration of the first zero voltage level from a non-zero value to zero to pre-charge the first and second capacitors of the second full bridge circuit.

16. The control circuit of claim 15, wherein decreasing, over the period of time, the internal phase shift value corresponding to the duration of the first zero voltage level from the non-zero value to zero includes:
decreasing, over the period of time, the internal phase shift value corresponding to the duration of the first zero voltage level from a value representing 180 degrees to a value representing 0 degrees.

17. The control circuit of claim 15, wherein setting the internal phase shift value corresponding to the duration of the one-half first DC voltage level to the first value includes:
setting the internal phase shift value corresponding to the duration of the one-half first DC voltage level to a value representing between 0 and 15 degrees inclusive; and
wherein setting the phase shift angle value representing the phase shift between the first DC voltage level and a second DC voltage level to the second value includes:
setting the phase shift angle value representing the phase shift between the first DC voltage level and a second DC voltage level to a value representing between 0 and 15 degrees inclusive.

18. The control circuit of claim 15, wherein decreasing, over the period of time, the internal phase shift value corresponding to the duration of the first zero voltage level from the non-zero value to zero includes:
decreasing, over 100 milliseconds, the internal phase shift value corresponding to the duration of the first zero voltage level from the non-zero value to zero.

19. The control circuit of claim 15, further configured for:
terminating the start-up phase after the period of time.

20. The control circuit of claim 15, further configured for:
controlling, after terminating the start-up phase, operation of the second plurality of electronic switches while controlling operation of the first plurality of electronic switches.

\* \* \* \* \*